United States Patent [19]

Venetucci

[11] Patent Number: 5,460,015
[45] Date of Patent: Oct. 24, 1995

[54] FREEZER WITH IMPERFORATE CONVEYOR BELT

[75] Inventor: Jim M. Venetucci, Forest Park, Ill.

[73] Assignee: Liquid Carbonic Corporation, Oak Brook, Ill.

[21] Appl. No.: 234,665

[22] Filed: Apr. 28, 1994

[51] Int. Cl.$^6$ ................................ F25D 17/02
[52] U.S. Cl. ................................ 62/374; 62/63
[58] Field of Search ................ 62/63, 374, 375

[56] References Cited

U.S. PATENT DOCUMENTS

| | | | |
|---|---|---|---|
| 993,321 | 5/1911 | Coddington | 62/374 |
| 1,907,649 | 5/1933 | Marx | 62/374 |
| 2,080,103 | 5/1937 | Zarotschenzeff | 62/375 |
| 2,974,497 | 3/1961 | Carpenter et al. | |
| 3,122,897 | 3/1964 | Overbye | |
| 3,187,514 | 6/1965 | Rendos | 62/375 |
| 3,253,420 | 5/1966 | De George | |
| 3,255,608 | 6/1966 | Macintosh | |
| 3,292,384 | 12/1966 | Rubin | |
| 3,376,710 | 4/1968 | Hirtensteiner | |
| 3,393,532 | 7/1968 | Khoylian | |
| 3,402,568 | 9/1968 | Kamin et al. | |
| 3,404,989 | 10/1968 | Hirtensteiner | |
| 3,436,927 | 4/1969 | Gruber | |
| 3,485,055 | 12/1969 | Webster et al. | |
| 3,507,128 | 4/1970 | Murphy et al. | |
| 3,553,973 | 1/1971 | Moran | |
| 3,613,386 | 10/1971 | Klee | |
| 3,664,149 | 5/1972 | Garland et al. | |
| 3,672,181 | 6/1972 | Tyree, Jr. | |
| 3,688,518 | 9/1972 | Goltsos | |
| 3,708,995 | 1/1973 | Berg | |
| 3,793,937 | 2/1974 | Lipoma | 62/374 |
| 3,815,377 | 6/1974 | Tyree, Jr. | |
| 3,841,109 | 10/1974 | Cann | |
| 3,844,133 | 10/1974 | Bierley et al. | |
| 3,871,185 | 3/1975 | Harper et al. | |
| 3,871,186 | 3/1975 | Wagner | |
| 3,871,190 | 3/1975 | Harper et al. | |
| 3,878,691 | 4/1975 | Asztalos | |
| 3,882,687 | 5/1975 | Asztalos et al. | |
| 3,898,863 | 8/1975 | Wagner | |
| 3,916,640 | 11/1975 | Rasovich | |
| 3,960,206 | 6/1976 | Baxter et al. | |
| 4,030,898 | 6/1977 | Morita | 62/375 |
| 4,086,783 | 5/1978 | Wagner et al. | |
| 4,086,784 | 5/1978 | Wagner | |
| 4,127,008 | 11/1978 | Tyree, Jr. | |
| 4,186,566 | 2/1980 | AuYoung | |
| 4,195,490 | 4/1980 | Soecknick et al. | |
| 4,229,947 | 10/1980 | Klee | |
| 4,237,695 | 12/1980 | Oberpriller et al. | |
| 4,276,753 | 7/1981 | Sandberg et al. | |
| 4,333,318 | 6/1982 | Tyree, Jr. | |
| 4,350,027 | 9/1982 | Tyree, Jr. | |
| 4,399,658 | 8/1983 | Nielsen | |
| 4,403,479 | 9/1983 | Rasovich | |
| 4,475,351 | 10/1984 | Klee | |
| 4,481,782 | 11/1984 | Mukerjee | |

(List continued on next page.)

FOREIGN PATENT DOCUMENTS

| | | |
|---|---|---|
| 0332287A1 | 9/1989 | European Pat. Off. |
| 496675 | 7/1954 | Italy |
| 121803 | 11/1958 | U.S.S.R. |

OTHER PUBLICATIONS

"Cryo–Shield® Liquid Carbonic Food Freezing Systems $CO_2$," 12 Page Brochure, Liquid Carbonic, Chicago, Illinois, Form No. 6720, ©1981 Liquid Carbonic Corporation.
"Ultra–Freeze® can boost your profits," 4 page brochure with insert pp. 1–6, CARDOX® Division of Chemetron Corporation, Countryside, Illinois, Form No. B–1, ©1978 Chemetron Corporation.

*Primary Examiner*—Ronald C. Capossela
*Attorney, Agent, or Firm*—Fitch, Even, Tabin & Flannery

[57] ABSTRACT

A freezer includes a conveyor belt within an enclosure. The conveyor belt is formed in an endless loop with top and bottom runs. Coolant is sprayed underneath the top run, and overspray is accumulated in a coolant bath through which the lower run passes to provide additional cooling.

23 Claims, 4 Drawing Sheets

U.S. PATENT DOCUMENTS

| | | |
|---|---|---|
| 4,528,819 | 7/1985 | Klee . |
| 4,589,264 | 5/1986 | Åström . |
| 4,739,623 | 4/1988 | Tyree, Jr. et al. . |
| 4,748,029 | 5/1988 | Alfred et al. . |
| 4,783,972 | 11/1988 | Tyree, Jr. et al. . |
| 4,852,358 | 8/1989 | Acharya et al. . |
| 4,866,946 | 9/1989 | Klee . |
| 4,881,379 | 11/1989 | Sakai . |
| 4,912,943 | 4/1990 | Hubert et al. . |
| 4,914,927 | 4/1990 | Miller et al. . |
| 5,018,438 | 5/1991 | Grandi . |

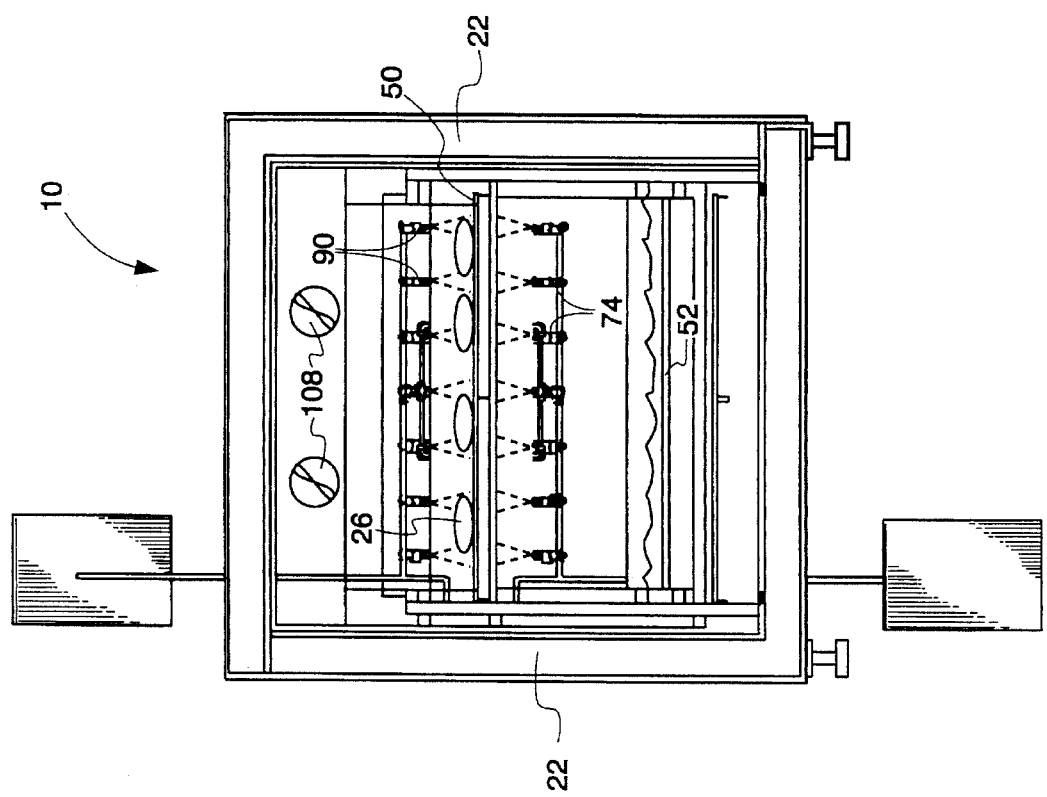
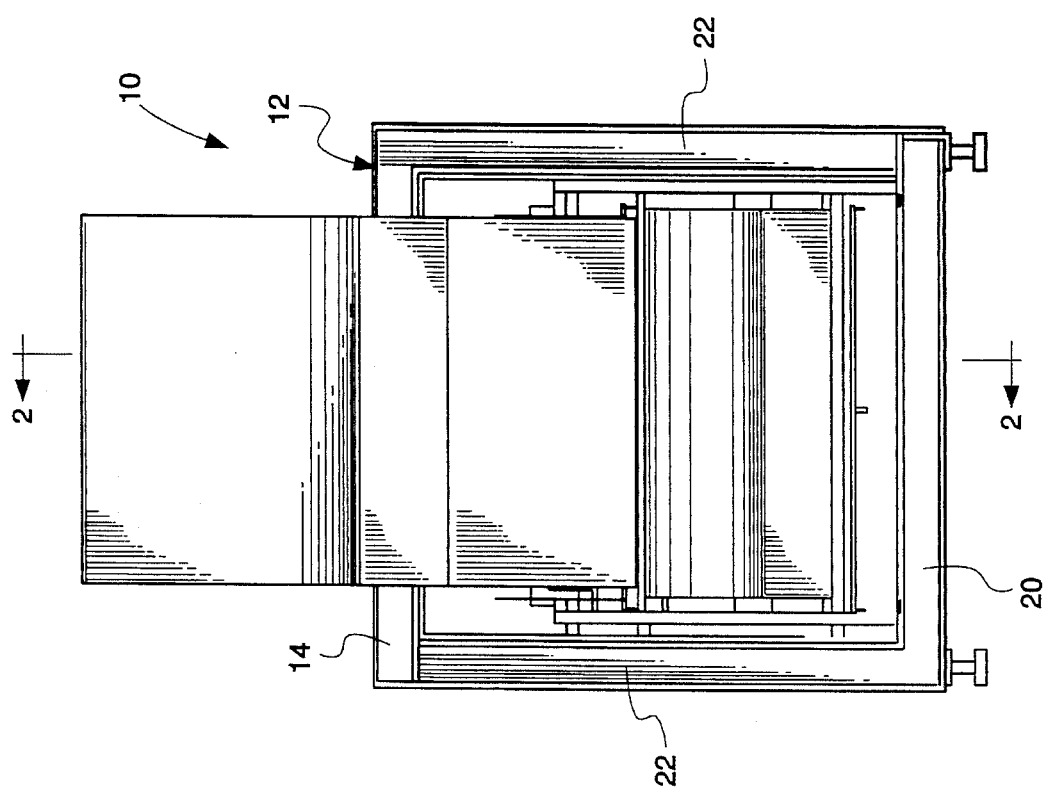

FREEZER WITH IMPERFORATE CONVEYOR BELT

BACKGROUND OF THE INVENTION

1. Field of the Invention

The present invention pertains to cooling devices employing conveyor belts for use in a continuous cooling operation, and in particular to freezers having a tunnel enclosure.

2. Description of the Related Art

Continuous process freezers and coolers have been employed for a variety of different products and are extensively employed in various food industries. For example, freeze-dried coffee, processed fish and meat parts are chilled or frozen in tunnel apparatus, using a variety of different coolant media. Brine solutions have been employed in these applications for some time, but cryogenic coolants such as liquid cryogen are becoming increasingly popular. Tunnel enclosures offer advantages of economical space utilization, and operational flexibility, since different cooling zones can be installed within the apparatus, to provide a continuous treatment of product as it travels through the tunnel enclosure.

Brine coolants offer significant disadvantages for processing food products. For example, contact between the brine solution and the food product must usually be avoided, and the viscosities of brine solutions change greatly over typical operating temperature ranges, thus complicating the flow handling equipment needed to circulate the brine solution. Cryogen coolants such as liquid nitrogen spray and bath treatments do not suffer from these drawbacks, and consequently are receiving widespread acceptance throughout the food industry. Cryogenic cooling can be carried out with conventional, readily available equipment and the viscosities and other physical properties of cryogenic coolants are well behaved over their typical operating ranges. Further, cryogenic coolants such as carbon dioxide snow and liquid nitrogen can be applied directly to food products without risk of contamination or deterioration of the product quality. Thus, economical direct contact spray and bath treatments of food products are possible with cryogenic coolants.

In cryogenic freezer tunnels and in other types of enclosures employing cryogenic coolants, the atmosphere is circulated using a plurality of fans, and circulations within enclosures are optimized to achieve different objectives. A typical purpose of such enclosures is to treat product carried on an endless conveyor belt which occupies the majority of interior volume within an enclosure. In order to minimize disturbance of desirable flow currents set up within an enclosure, so-called foraminous or perforate belting has been employed to convey products through an enclosure. Significant improvements in cooling rates can be achieved for a wide variety of food products using perforate conveyor belts; however, there are a substantial number of food products which are unsuitable for use with perforate conveyor belts. Examples of such products are chocolate, soup, semi-liquid foods, coffee extract, dough products and very small size or crumbly protein foods, such as processed meat and fish. It is desirable that such products be cooled using direct contact cryogenic techniques, and advances are being sought in this field.

SUMMARY OF THE INVENTION

It is an object of the present invention to provide apparatus for continuously cooling and freezing a wide variety of products, including food products.

Another object of the present invention is to provide cooling and freezing apparatus of the above type which is suitable for use in conventional tunnel enclosures.

A further object of the present invention is to provide cooling and freezing apparatus suitable for use with liquid, friable, frangible and other types of products which are unsuitable for use with perforate conveyor belts.

These and other objects of the present invention, which will become apparent from studying the appended description and drawings, are provided in a freezer, comprising:

an enclosure having an inlet end and an outlet end;

a conveyor belt having a substantially solid surface with top and bottom runs and formed in an endless loop;

a coolant bath below said top conveyor run; and means for directing at least a portion of the bottom conveyor run through the coolant bath.

BRIEF DESCRIPTION OF THE DRAWINGS

FIG. 1 is an end view of freezer apparatus according to principles of the present invention.

FIG. 3 is a cross-sectional view taken along the line 3—3 of FIG. 2.

DETAILED DESCRIPTION OF THE PREFERRED EMBODIMENT

Figure 2:
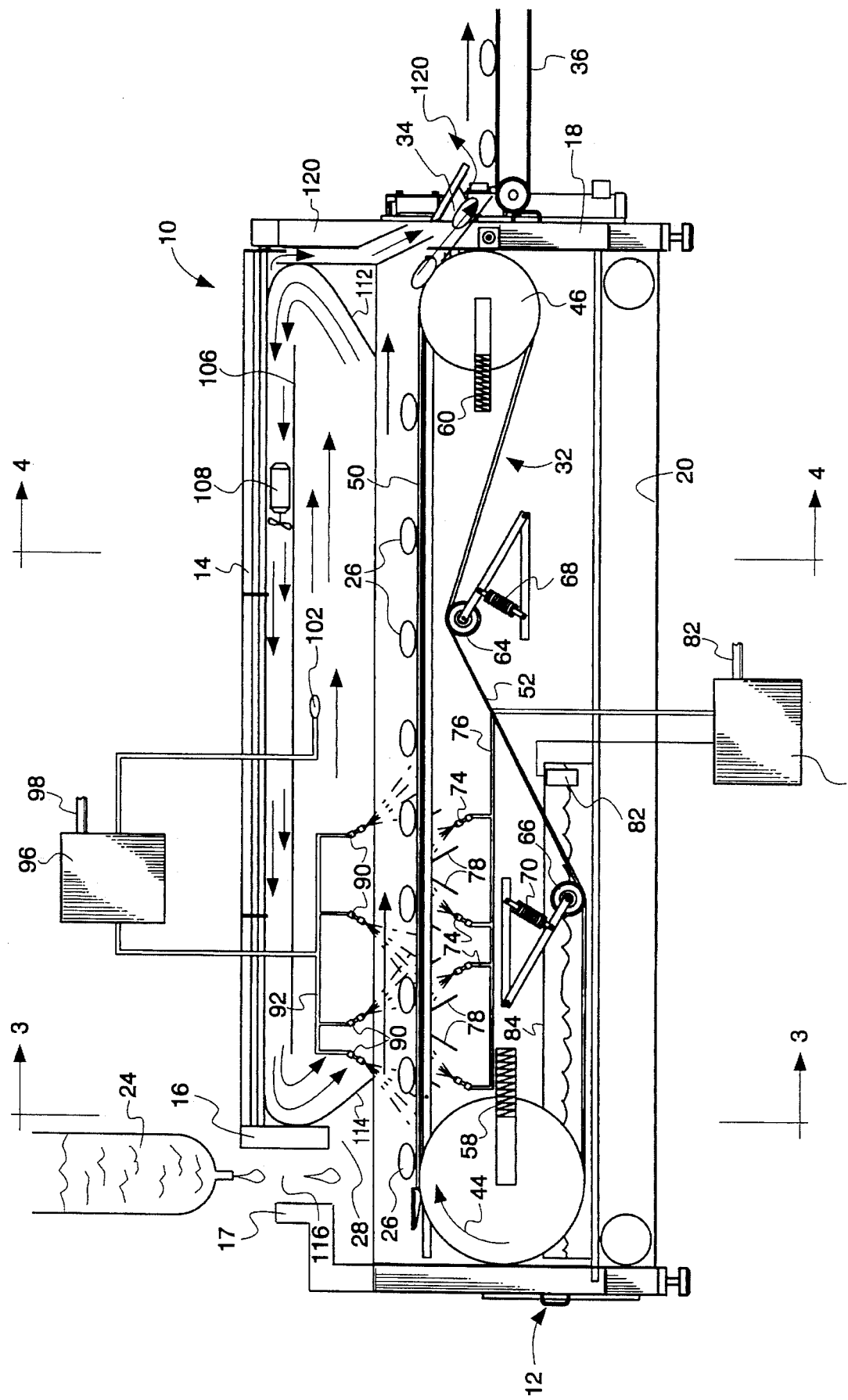
FIG. 2 is a cross-sectional view taken along the line 2—2 of FIG. 1.
Figure 4:
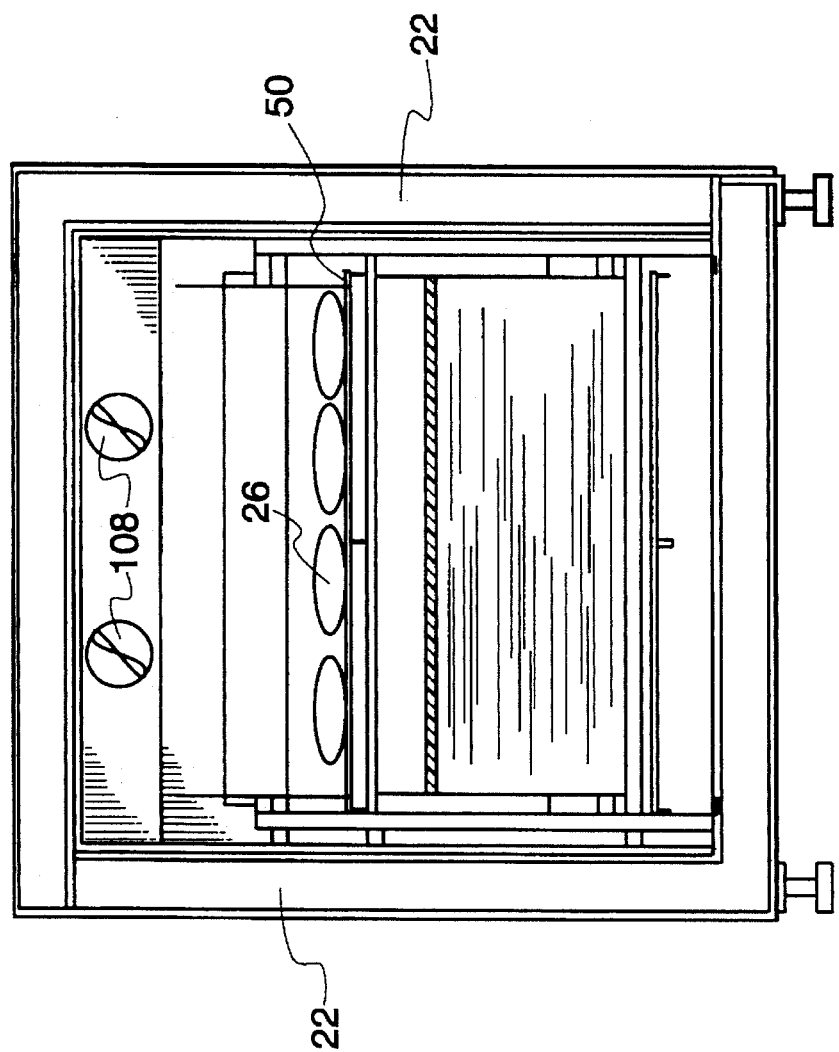
FIG. 4 is a cross-sectional view taken along the line 4—4 of FIG. 2.

FIGS. 1 and 2 show a freezer apparatus generally indicated at 10, having a tunnel configuration. Although reference is made to a "freezer" apparatus, it will be readily appreciated by those skilled in the art that the present invention could also be used for the cooling or chilling of products, rather than freezing, and such is intended.

Apparatus 10 includes a tunnel enclosure generally indicated at 12, including a removable cover 14, an entrance end wall 16, an exit end wall 18, a floor 20, and sidewalls 22. A product feeding device schematically indicated as a dispenser 24 feeds individual products 26 into an inlet opening 28 formed between wall 16 of the enclosure and a vapor dam 17. The products are carried through the freezer apparatus by a conveyor generally indicated at 32, and pass through an exit opening 34 in wall 18 so as to be carried downstream by an external conveyor 36, located outside of the freezer.

The conveyor 32 includes a conveyor belt 40 formed in an endless loop, so as to have upper and lower runs 50, 52, respectively, as can be seen in FIG. 2. According to one aspect of the present invention, the conveyor belt 40 is preferably of nonforaminous or imperforate construction. For example, the conveyor belt 40 can be made of stainless steel or other metallic materials, as well as plastic materials such as TEFLON, fabric materials, or composite constructions which can successfully withstand cryogenic temperatures, which are compatible with the products 26 being treated, and which is otherwise suitable for the intended application. In the most preferred embodiment, the conveyor belt 40 is made of a solid sheet of stainless steel, or solid sections of stainless steel which are hinged or otherwise secured together to form the endless loop, as shown.

The belt loop has an inlet end where belt 40 passes over a roller 44, and an outlet end where belt 40 passes over a roller 46. In the preferred embodiment illustrated in FIG. 2, the rollers 44, 46 have horizontal tangent lines aligned in a common horizontal plane, so that the upper run 50 of the belt loop is generally horizontal. As shown, the rollers 44, 46 are of dissimilar size, although this is not essential to practicing the present invention. The smaller roller 46 is employed at the downstream end to provide a convenient mode of transitioning the lower run 52 of the belt loop from an elevated downstream end to a lowered or depressed upstream end.

As can be seen in FIG. 2, the lower end of roller 44 is located a substantial distance below the lower end of roller 46. The rollers 44, 46 are mounted for rotation about their respective axes, and as shown in FIG. 2, the roller surfaces are closely spaced to their respective end walls 16, 18. If desired, the rollers could be spaced a small amount from their adjacent end walls, and could be biased by springs, such as compression springs 56, 58, if desired, to provide tensioning of the conveyor belt, as well as a means for ready removal and installation of a conveyor belt in the freezer apparatus. When employed, the compression springs 58, 60 bias the rollers 44, 46 in directions apart from one another so as to increase belt tension. The compression springs also accommodate contraction of the conveyor belt due to shrinkage caused by low temperatures within the freezer apparatus.

The lower run 52 of the belt loop follows a path defined, in part, by idler rollers 64, 66. If desired, the idler rollers 64, 66 could be mounted in a fixed position, relying on the tensioning force provided by springs 58, 60. However, it is preferred that the idler rollers 64, 66 be spring-loaded by springs 68, 70 to further increase belt tension.

If desired, the compression springs 58, 60 could be replaced by nonresilient tensioning means such as threaded shafts for adjustably positioning the rotational axes of rollers 44, 46 so as to adjustably control the spacing between them.

According to an aspect of the present invention, the upper run 50 of the conveyor belt is cooled from below by upwardly directed coolant sprays. In the preferred embodiment, spray nozzles 74 are fed from a common manifold 76 to receive a suitable coolant, preferably liquid nitrogen. The pressure and volume of the nozzles 74 is regulated by a control unit 80 which receives liquid nitrogen through supply line 82 connected to an external source of the cryogen coolant. A control unit 80 preferably includes a liquid level sensor 82, as will be discussed herein. The liquid nitrogen is sprayed against the underside of the conveyor belt, and excess coolant is collected in a tank 84 located below the nozzle 74. According to one aspect of the present invention, the control unit 80 ensures an amount of overspray from nozzle 74 sufficient to maintain a level in tank 84, as sensed by level sensor 82.

The idler roller 66 is located below the lower horizontal tangent line of roller 46 and cooperates with roller 44 to define a depressed portion of belt travel in the lower run 52. Preferably, the idler roller 66 is located within tank 84, and thus the depressed portion of the bottom conveyor run is immersed in the liquid coolant within tank 84, to provide a refrigerating bath for the conveyor belt. Preferably, the refrigerating bath is located immediately upstream of the freezer inlet 28 in preparation to receive product entering the freezer.

As shown in FIG. 2, it is generally preferred that roller 44 also be located within tank 84 and the coolant bath therein. If desired, the heat capacity of roller 44 can be controlled, as desired. For example, the roller 44 can be of relatively massive construction to provide additional thermal inertia for the conveyor belt at the inlet end of the freezer. Alternatively, the roller 44 could be made of less massive construction and could even be made of a thermal insulating material, if desired. As a further alternative, the roller 44 could comprise the outer surface of a drum containing suitable coolant, such as an additional quantity of liquid nitrogen. In any event, the conveyor belt is cooled immediately prior to its reception of product to be treated. Preferably, the conveyor belt and cryogen bath and tank 84 are selected so as to instantly freeze the bottom surface of product being placed on the conveyor belt, to accelerate the freezing process, and to reduce the dwell time necessary for freezing treatment of a wide variety of commercially important products. Heat transfer advantages have been provided for product interfaces which are rapidly frozen so as to provide a thermal conduction path toward the product interior.

Although not required, it is preferred that the conveyor belt have a smooth outer surface in order to achieve a number of advantages. For example, a smooth outer surface with instantaneous or very rapid freezing upon contact with the belt surface imparts a carefully controlled solidified shape for amorphous food products such as coffee extract, and pureed and ground foods, for example. Further, a smooth outer belt surface eliminates problems associated with belt marking. This is important for soft or delicate products such as candy, cookies, dough products, for example, which are being frozen. Belt marking is objectional in a wide variety of products and reduces the product value. Further, a smooth outer belt of the conveyor belt 40 preserves the appearance and product weight of high value foods such an marinated meat and poultry, fish fillets, waffles, and red meats.

A smooth outer surface, especially coupled with rapid freezing upon contact with the belt surface, helps to ensure a clean release of the product at the exit end of the freezer apparatus, without plug-like portions being ripped out of a product surface, as might occur when so-called open or perforate conveyor belts are inappropriately used with delicate products which tend to mold around corners and edges of the belt links. Further, a solid conveyor belt with a smooth product-contacting surface prevents product from flowing into cavities of the conveyor belt, being wedged therein when frozen.

As can be seen from the brief discussion here, food products present a wide variety of different delicate features, each requiring different considerations when designing a commercially efficient freezer apparatus. As a further example of a delicate food product (i.e., delicate in different ways from that discussed above), wet marinated poultry has a relatively dense interior constitution which requires a substantial amount of cooling to treat the core portions of the product. When the wet, marinated poultry is maintained with its outer skin, it has been observed that the forces holding the skin onto the frozen poultry are relatively weak, and that the skin can be easily torn from the surface of the relatively massive product, with a consequent reduction in product value.

An overhead spray system is also incorporated in the freezing apparatus of the preferred embodiment. FIG. 2 shows a series of spray heads 90 coupled to a common header 92, to receive coolant (preferably liquid nitrogen) flow under the regulation of a control unit 96. Control unit 96 receives liquid nitrogen from a supply connection 98 coupling the control unit 96 to a coolant source. Preferably, the connections 82, 98 couple the respective control units 80, 96 to a common source of liquid nitrogen, and thus, preferably, the same cooling media is used above and below the upper conveyor run, although this is not necessary.

The control unit 96 includes a temperature sensor 102 which senses the interior temperature of the enclosure, at a point downstream of the nozzles 90. A plenum 106 is preferably provided to circulate the cooling atmosphere above the conveyor belt, and to provide cryogen control at the inlet and outlet openings 28, 34 of the enclosure. The plenum is preferably located in cover 14 and includes a blower 108 which circulates an atmosphere flow across the upper conveyor belt run, in the same direction as that of the conveyor belt travel. Deflector shields 112, 114 are provided at the outlet and inlet ends of plenum 106 to confine the majority of the atmospheric flow within enclosure 12. The pressure and flow conditions set up by blower 108 within plenum 106 can provide an effective vapor lock at the inlet and exit openings 28, 34, if desired. A small, controlled amount of vapor flow is allowed to leave the entrance opening 28 so as to form a vapor pool 116 immediately outside the enclosure entrance. This feature, however, is optional and could be omitted if desired. In a similar manner, a small flow, indicated by arrows 120, is allowed to escape the exit opening 34 to form a vapor pool at the enclosure exit. However, this vapor pool at the exit end of the enclosure is also optional and could be omitted, if desired.

It is generally preferred that the lower control unit 80 receive input control signals from a liquid level sensor 82 and that the upper control unit 96 (when employed) receive control signals from a temperature sensor 102. However, other control strategies for the cryogen spray could also be employed. For example, if it is desired to maintain a certain liquid level in tank 84, and the overspray or excess discharge from nozzles 74 is undesirable, liquid nitrogen from supply line 82 could be directly piped to tank 84 by control unit 80, under control of the liquid level sensor 82, in a separate piping run, separate from manifold 76. Accordingly, the control unit 80 could incorporate a temperature sensor within enclosure 12 (for example, immediately underneath the upper conveyor run) to provide a control signal for regulating the amount of liquid nitrogen fed to manifold 76, and thus control of the spray discharge from nozzle 74 and of the liquid level in tank 84 could be separated, if desired. In this alternative arrangement, the liquid nitrogen pumped directly to tank 84 could be routed through roller 44 to provide additional cooling for the roller, with the cryogen flow being allowed to run off into tank 84. Also, the level in tank 84 could be maintained by allowing nozzles 90 to emit an overspray which is collected and channeled to tank 84, past the sides of the conveyor belt. For example, gutters could be provided along the edges of the upper conveyor run, with downspouts leading to the interior of tank 84.

If desired, collecting plates 78 could be installed underneath the upper conveyor run to collect overspray, directing the overspray into tank 84. The collector plates 78 could be arranged to prevent the spray patterns from interfering with one another, thereby optimizing the thermal efficiencies of contact between the sprayed cryogen and the conveyor belt. If desired, the collector plates 78 could be made relatively massive so as to increase the thermal inertia in the vicinity immediately adjacent the conveyor belt.

Figure 5:
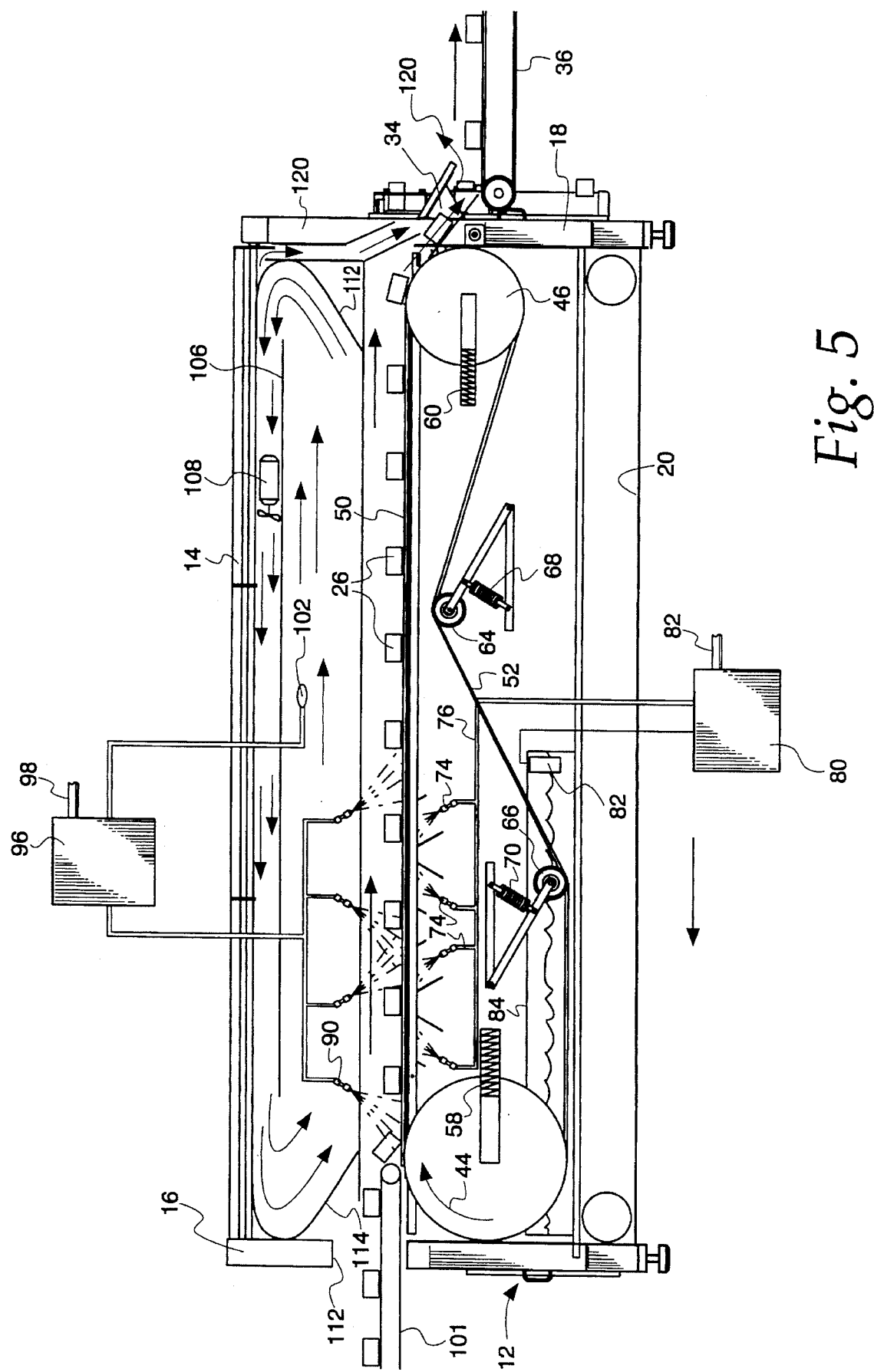
FIG. 5 is a cross-sectional view of an alternative embodiment of the freezer apparatus.

A tunnel enclosure has been used to describe the present invention, although the present invention could also be readily employed with tunnel enclosures having other configurations, as well as enclosures of different types, such as cabinet freezers and helical conveyor freezers. FIG. 5, for example, shows an alternative arrangement of a tunnel freezer where a conveyor belt 101 passes outside of the insulated enclosure, through an opening 112.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A freezer for freezing articles, comprising:

an enclosure having an inlet end and an outlet end;

a conveyor belt having a substantially solid surface with top and bottom runs and formed in an endless loop with the articles carried only on the top run, between inlet and outlet ends of the enclosure;

a coolant bath below said top conveyor run; and means for directing at least a portion of the bottom conveyor run through the coolant bath.

2. The freezer of claim 1 further comprising a liquid level sensor for sensing the level of coolant in the coolant bath, and valve controller means responsive to the liquid level sensor, for coupling the coolant bath to a coolant supply and for controlling the amount of coolant supplied to the coolant bath.

3. The freezer of claim 2 further comprising means coupling the coolant spray to said valve controller.

4. The freezer of claim 2 wherein said conveyor belt comprises a metal sheet.

5. The freezer of claim 1 further comprising an upwardly directed coolant spray directed against the top conveyor run.

6. The freezer of claim 5 further comprising a tank located below said coolant spray, with a portion of said coolant spray falling into said coolant bath to form at least a part of the coolant bath.

7. The freezer of claim 1 wherein said coolant bath is located adjacent the inlet end of said enclosure.

8. The freezer of claim 7 further comprising a plenum above the conveyor belt extending along at least a portion of the conveyor belt.

9. The freezer of claim 7 further comprising a fan in said plenum and having a discharge directed opposite of the direction of travel of the top conveyor run.

10. The freezer of claim 1 further comprising an overhead coolant spray downwardly directed against the top conveyor run.

11. A freezer, comprising:

an enclosure having an inlet end and an outlet end;

a conveyor belt having a substantially solid surface, formed in an endless loop having top and bottom runs;

an upwardly directed coolant spray directed against the top conveyor run;

a coolant bath below said coolant spray collecting coolant from the coolant spray;

directing means for directing at least a portion of the bottom conveyor run through the coolant bath.

12. The freezer of claim 11 wherein said conveyor belt has a substantially smooth surface.

13. The freezer of claim 11 wherein said directing means is located adjacent the inlet end of said enclosure.

14. The freezer of claim 11 wherein a portion of the bottom conveyor run is depressed with respect to the remainder of the bottom conveyor run by said directing 15. The freezer of claim 11 further comprising overhead coolant sprays downwardly directed against the top conveyor run.

16. The freezer of claim 15 further comprising a fan means in said plenum and having a discharge directed opposite of the direction of travel of the top conveyor run.

17. The freezer of claim 15 further comprising a plenum above the conveyor belt extending along at least a portion of the conveyor belt.

18. A freezer, comprising:

an enclosure having an inlet end and an outlet end;

a conveyor belt formed in an endless loop, the conveyor belt having top and bottom runs and a substantially solid surface;

an upwardly directed coolant spray directed against the top conveyor run;

a coolant bath below said coolant spray collecting coolant from the coolant spray;

directing means for directing at least a portion of the bottom conveyor run through the coolant bath;

a plenum above the conveyor belt extending along at least a portion of the conveyor belt; and a fan in said plenum and having a discharge directed opposite of the direction of travel of the top conveyor run.

19. The freezer of claim 18 wherein said portion of the bottom conveyor run is located adjacent the inlet end of said enclosure.

20. The freezer of claim 18 wherein a portion of the bottom conveyor run is depressed with respect to the remainder of the bottom conveyor run by said directing means.

21. The freezer of claim 18 further comprising overhead coolant sprays downwardly directed against the top conveyor run.

22. The freezer of claim 18 further comprising a liquid level sensor for sensing the level of coolant of the coolant bath, and valve means for coupling an external coolant supply to the coolant bath and for controlling the amount of coolant supplied to the coolant bath.

23. The freezer of claim 22 further comprising means coupling the coolant spray to said valve means.

* * * * *